United States Patent
Jiang et al.

(10) Patent No.: US 11,928,513 B1
(45) Date of Patent: Mar. 12, 2024

(54) CLOUD AFFINITY BASED ON EVALUATION OF STATIC AND DYNAMIC WORKLOAD CHARACTERISTICS

(71) Applicant: International Business Machines Corporation, Armonk, NY (US)

(72) Inventors: Peng Hui Jiang, Beijing (CN); Dong Hui Liu, Beijing (CN); Jia Tian Zhong, Beijing (CN); Xing Xing Shen, Beijing (CN); Jia Yu, Beijing (CN); Yong Yin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/089,750

(22) Filed: Dec. 28, 2022

(51) Int. Cl.
  *G06F 9/50* (2006.01)
  *G06F 9/38* (2018.01)
(52) U.S. Cl.
  CPC .......... *G06F 9/5033* (2013.01); *G06F 9/3836* (2013.01); *G06F 9/505* (2013.01)
(58) Field of Classification Search
  CPC ....... G06F 9/5033; G06F 9/3836; G06F 9/505
  See application file for complete search history.

(56) References Cited

U.S. PATENT DOCUMENTS

| 10,326,649 | B2 | 6/2019 | Steinder et al. |
| 11,194,604 | B2 | 12/2021 | Calder et al. |
| 2013/0111032 | A1 | 5/2013 | Alapati et al. |
| 2017/0169212 | A1 | 6/2017 | Bello et al. |
| 2018/0210763 | A1 | 7/2018 | Kumar et al. |
| 2020/0026560 | A1* | 1/2020 | Singh ..................... G06F 9/5083 |
| 2021/0103468 | A1* | 4/2021 | Wang ..................... G06F 9/5044 |
| 2022/0229707 | A1* | 7/2022 | Lange .................... G06F 9/5083 |

FOREIGN PATENT DOCUMENTS

CN    104040526 B    12/2017

OTHER PUBLICATIONS

"Placing pods relative to other pods using affinity and anti-affinity rules", RedHat, Inc., accessed online Sep. 16, 2022, 12 pages.

(Continued)

*Primary Examiner* — Kim T Nguyen
(74) *Attorney, Agent, or Firm* — Stephen J. Walder, Jr.; Aaron Pontikos

(57) ABSTRACT

Mechanisms are provided for scheduling a workload in a cloud computing system. A cloud affinity factor (CAF) computer model is trained, via a machine learning process based on a training dataset comprising static characteristics of a workload binary for a workload, and dynamic characteristics corresponding to historical performance data for the workload, such that the trained CAF computer model predicts a performance classification for a given workload binary. The trained CAF computer model processes a new workload to generate a performance classification for the new workload. Cloud affinity factor(s) are generated based on the performance classification for the new workload. Node affinity and dispatch rule(s) are applied to the cloud affinity factor(s) to select one or more nodes of the cloud computing system to which to dispatch the workload. The workload is then scheduled on the selected one or more nodes.

20 Claims, 6 Drawing Sheets

(56) References Cited

OTHER PUBLICATIONS

Cowan, Jeremy, "Scaling Kubernetes with Karpenter: Advanced Scheduling with Pod Affinity and Volume Topology Awareness", Amazon, Jul. 18, 2022, 10 pages.
Fu, Xiong et al., "Predicted Affinity Based Virtual Machine Placement in Cloud Computing Environments", IEEE Transactions on Cloud Computing, Aug. 9, 2017, 11 pages.

\* cited by examiner

CLOUD AFFINITY BASED ON EVALUATION OF STATIC AND DYNAMIC WORKLOAD CHARACTERISTICS

BACKGROUND

The present application relates generally to an improved data processing apparatus and method and more specifically to an improved computing tool and improved computing tool operations/functionality for executing workloads in a cloud environment based on cloud affinity determined by an artificial intelligence evaluation of static and dynamic workload characteristics.

Cloud computing is on-demand access, via the internet, to computing resources, such as applications, servers (physical servers and virtual servers), data storage, development tools, networking capabilities, and more, which are hosted at a remote data center managed by a cloud services provider (CSP). The CSP makes these resources available for a monthly subscription fee or bills them according to usage. Compared to traditional on-premises information technology (IT), and depending on the cloud services one selects, cloud computing helps do the following:

(1) Lower IT costs: Cloud lets you offload some or most of the costs and effort of purchasing, installing, configuring, and managing your own on-premises infrastructure;

(2) Improve agility and time-to-value: With cloud, your organization can start using enterprise applications in minutes, instead of waiting weeks or months for IT to respond to a request, purchase and configure supporting hardware, and install software. Cloud also lets you empower certain users—specifically developers and data scientists—to help themselves to software and support infrastructure; and (3) Scale more easily and cost-effectively: Cloud provides elasticity—instead of purchasing excess capacity that sits unused during slow periods, you can scale capacity up and down in response to spikes and dips in traffic. You can also take advantage of your cloud provider's global network to spread your applications closer to users around the world.

The term "cloud computing" also refers to the technology that makes the cloud work. This includes some form of virtualized IT infrastructure, e.g., servers, operating system software, networking, and other infrastructure, that is abstracted, using special software, so that it can be pooled and divided irrespective of physical hardware boundaries. For example, a single hardware server can be divided into multiple virtual servers. Virtualization enables cloud providers to make maximum use of their data center resources.

Many entities, e.g., corporations, government agencies, and the like, have adopted the cloud delivery model for their on-premises infrastructure so they can realize maximum utilization and cost savings versus traditional IT infrastructure, and offer the same self-service and agility to their end-users.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for scheduling a workload in a cloud computing system. The method comprises training a cloud affinity factor (CAF) computer model, via a machine learning process based on a training dataset comprising static characteristics of a workload binary for a workload, and dynamic characteristics corresponding to historical performance data for the workload, such that the trained CAF computer model predicts a performance classification for a given workload binary. The method further comprises processing, by the trained CAF computer model, a new workload to generate a performance classification for the new workload. In addition, the method comprises generating one or more cloud affinity factors based on the performance classification for the new workload and applying at least one node affinity and dispatch rule to the one or more cloud affinity factors to select one or more nodes of the cloud computing system to which to dispatch the workload. The method further comprises scheduling the workload on the selected one or more nodes. In this way, automated machine learning processes provide mechanisms for scheduling workloads to nodes based on both static and dynamic characteristics of the workloads.

In some illustrative embodiments, training the CAF computer model comprises extracting the static characteristics from the workload binary and encoding the static characteristics as a feature vector. Thus, a feature vector input is provided for machine learning of patterns of static characteristics to predict performance of workloads having these patterns of static characteristics.

In some illustrative embodiments, training the CAF computer model comprises extracting the dynamic characteristics from the historical performance data for the workload and building a performance index for multiple performance factors of the workload. The performance index is used as ground truth labels, during the training, for corresponding static characteristics encoded in the feature vector to specify a predicted performance that will be achieved with a workload having the corresponding static characteristics. Thus, the dynamic characteristics from the historical performance data serves as a ground truth for machine learning such that patterns of static characteristics of workloads may be used to predict dynamic performance based on the machine learning of the CAF computer model.

In some illustrative embodiments, training the CAF computer model comprises processing the feature vector to generate a predicted performance classification, and comparing the predicted performance classification to the performance index to determine a loss, and modifying operational parameters of the CAF computer model to reduce the loss. Thus, based on the loss evaluation, the CAF computer model may be updated to more accurately predict performance based on static characteristics of workloads as encoded in a feature vector.

In some illustrative embodiments, extracting the static characteristics from the workload binary comprises extracting a plurality of n-grams, each n-gram comprising a pattern of one or more opcodes. The extraction further comprises associating, for each n-gram, a frequency of occurrence of a corresponding pattern of opcodes of the n-gram, in the training dataset, and then selecting a subset of n-grams based on the frequency of occurrence of each n-gram. In some illustrative embodiments, dimensions corresponding to the subset of n-grams are selected as dimensions for the feature vector. Thus, the dimensionality of the feature vector may be determined based on the frequency of occurrence of the patterns of opcodes of n-grams in the training dataset.

In some illustrative embodiments, the CAF computer model comprises a plurality of computer models, each corresponding to a different type of performance classification, and wherein the CAF computer model is an ensemble of the plurality of computer models that generates a combined set of affinity factors based on the individual outputs from the computer models in the plurality of computer models. In some illustrative embodiments, the plurality of computer models comprises a first machine learning computer model for classifying workloads with regard to central processing unit (CPU) usage, a second machine learning computer model for classifying workloads with regard to memory usage, a third machine learning computer model for classifying workloads with regard to input/output intensiveness, and a fourth machine learning computer model for classifying workloads with regard to networking intensiveness. In this way, separate computer models may be used to evaluate workloads with regard to different performance classifications and generate corresponding affinity factors.

In some illustrative embodiments, the method further comprises learning, through a machine learning operation, weights to be applied to each of the one or more cloud affinity factors to generate a dispatch cloud affinity value based on a dispatch cloud affinity formula. In this way, different cloud affinity factors may be more or less heavily weighted in determining to which nodes to dispatch the workloads.

In some illustrative embodiments, generating one or more cloud affinity factors based on the performance classification for the new workload comprises storing an entry for the new workload in a dispatch knowledge base, wherein the entry specifies the one or more cloud affinity factors, and wherein applying the at least one node affinity and dispatch rule to the one or more cloud affinity factors comprises a dispatcher retrieving the entry from the dispatch knowledge base and searching a set of nodes based on the at least one node affinity and dispatch rule to find at least one node in the set of nodes that provides resources to satisfy performance criteria corresponding to the one or more cloud affinity factors. Thus, the dispatcher may process the entries when conditions are appropriate for dispatching workloads to nodes.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
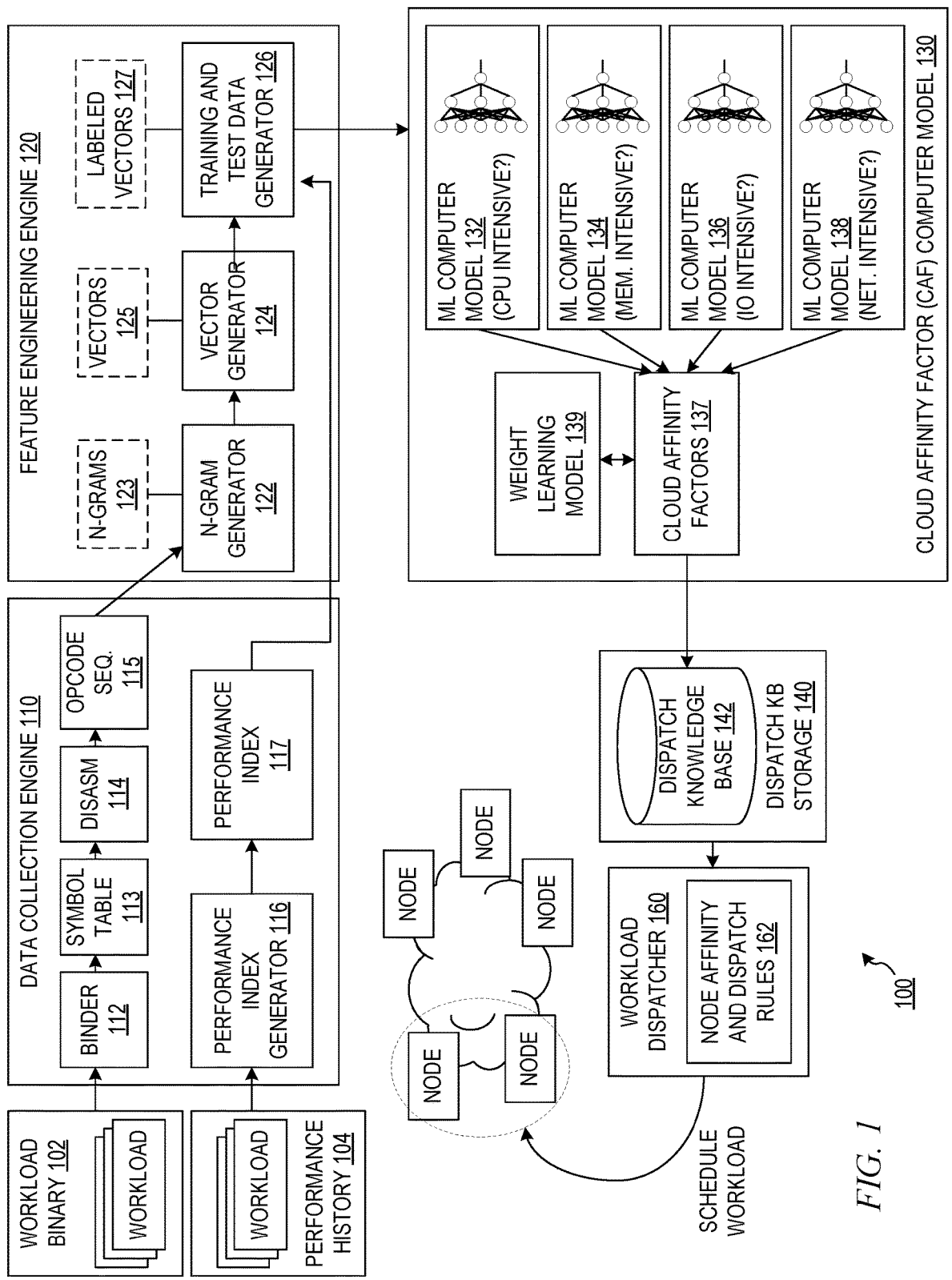
FIG. 1 is an example diagram of the primary operational components of a cloud affinity based workload scheduler in accordance with one illustrative embodiment.

The illustrative embodiments described herein provide an improved computing tool and improved computing tool operations/functionality for executing workloads in a cloud environment based on cloud affinity determined by an artificial intelligence evaluation of static and dynamic workload characteristics. In cloud computing environments, as such cloud computing environments service many different workloads at substantially the same time, it is important to be able to schedule these workloads on the virtual and physical computing resources of the cloud computing system service. In performing such scheduling, it is beneficial to have mechanisms that determine how to reasonably distribute workloads across the nodes/pods of the cloud computing system, so that the nodes/pods achieve a relative load balancing state while avoiding opening too many low utilization nodes/pods which would result in wasted resources and added costs to users. The illustrative embodiments provide mechanisms that leverage machine learning and artificial intelligence to evaluate the affinity of workloads to cloud computing system resources, from both the static and dynamic characteristics of the workload, so as to provide an improved workload distribution within the cloud computing system.

While the concepts of nodes, pods, and containers will be referenced herein, based on a Kubernetes (K8s) cloud computing system implementation, the illustrative embodiments are not limited to such. Rather, the mechanisms of the illustrative embodiments may be implemented in any cloud computing system architecture in which workloads are scheduled on the virtual and physical resources of the cloud computing system. Assuming a K8s based cloud computing system (hereafter referred to simply as a "cloud") implementation, a node is a smallest unit of computing hardware in the K8s implementation, e.g., a single physical or virtual machine in a datacenter. Applications are deployed and executing in the K8s cloud implementation as containers, which are self-contained applications having all the needed libraries, dependencies, and the like, for execution in various execution environments. K8s cloud implementations package such containers into a higher level structure, which is referred to as a pod, such that the containers in the same pod will share the local network and resources and can communicate with one another.

With regard to scheduling, K8s cloud implementations use a kube-scheduler to schedule pods. The kube-scheduler based scheduling of workloads involves three main steps for performing scheduling of a pod, referred to as predicates (or filtering), scoring, and binding. The filtering, which is based on predicates, determines what set of nodes are available for a pod to be scheduled on. The predicates, which are tests that have responses that indicate true/false, e.g., can you provide 2 GB of memory, with the result of this test being true if the node can, and false if the node cannot. As an example of the filtering, the PodFitsResources filter checks whether a candidate node has enough available resources to satisfy the specific resource requests for a pod. After filtering, a node list is generated that contains the suitable node(s), but if the list is empty the pod cannot yet be scheduled. The scoring operation involves the kube-scheduler scoring or ranking the nodes in the node list to choose the most suitable assignment of the pod to nodes in the K8s cloud computing system. The scoring is based on a scoring policy having specifications of priorities. Users can customize the scheduling policy and configuration when the default predicates and scoring policy do not provide satisfactory performance.

Considering the affinity and anti-affinity of workloads, pods, and nodes allows for flexible decision making in the scheduling of workloads, i.e., one or more pods, to nodes in a cloud computing system. Affinity refers to characteristics of the workload and characteristics of the nodes indicating a more efficient or more beneficial execution of the workload should the workload be scheduled on those nodes. Anti-affinity refers to characteristics of the nodes indicative of a less efficient or less beneficial execution of the workload should the workload be scheduled on those nodes. Affinity based scheduling policies are classified into node affinity, pod affinity, and pod anti-affinity.

While such affinity and anti-affinity considerations may provide a more flexible scheduling, determining the affinity and anti-affinity between workloads, pods, and nodes is a difficult task to accomplish automatically, and instead is implemented as a set of predefined rules defined by a human subject matter expert (SME) based on their experience. This leads to affinity/anti-affinity scheduling policies that are static and do not adapt to the dynamic performance of workloads within the cloud computing system. Moreover, as they are dependent on human experience, they may generate inefficient results for some workloads due to limitations in human knowledge and capabilities to consider a very limited amount of characteristics of workload, pods, and nodes due to limits of human mental abilities, and due to certain workloads not being able to achieve higher throughputs even if given more resources. Thus, there is a need for an automated workload scheduling mechanism that can reasonably allocate cloud computing system resources in a comprehensive manner, taking into account both the static and dynamic characteristics of a workload, especially in a cloud environment in which multiple workloads are being run at the same time but with different characteristics and where different nodes may have different characteristics of availability and capabilities.

The illustrative embodiments provide an artificial intelligence based improved computing tool and improved computing tool operations/functionality that schedules workloads in a cloud computing system, such as a K8s cloud computing architecture, so as to improve cloud workload affinity and reduce anti-infinity by evaluating both the static and dynamic characteristics of the workload. With the improved computing tool, workload static characteristics are extracted by analyzing the workload binaries. The workload's dynamic characteristics are extracted from workload performance history data. The static characteristics are converted to a feature vector, such as by using an N-gram approach to convert assembler instruction sequences of the workload to N-grams and then encode the N-grams into a feature vector. The dynamic characteristics are used to build a performance index for multiple performance factors such as CPU usage, memory usage, PO performance features, network performance features, and the like.

The feature vector generated from the static characteristics, and the performance index generated from the dynamic characteristics, are used to generate a training dataset where the performance index is used as ground truth labels for the corresponding static characteristics encoded in the feature vector. That is, the feature vector specifies the static characteristics of the workload, and the performance index represents the performance that the workload will exhibit, such that by training on this data, a computer model will be able to predict that given the static features in the feature vector, the performance will be as indicated in the performance index. For purpose of the illustrative embodiments, this training data is used to train one or more machine learning computer models using a machine learning process, such as a multi-task supervised learning process, where the multiple tasks may be associated with the different performance index categories, e.g., CPU usage, memory usage, I/O performance, network performance, and the like. The one or more machine learning trained computer models, e.g., neural networks (NN), deep learning neural networks (DNN), recurrent neural networks (RNNs), or any other known or later developed machine learning trained computer model, is/are referred to herein as the cloud affinity factor (CAF) computer model because the CAF computer model, outputs one or more cloud affinity factors upon which node affinity rules are executed to schedule the workloads to the various nodes in the cloud computing system.

In some illustrative embodiments, the CAF computer model may be a set of machine learning computer models that are trained to classify workloads as to various classes of performance, an ensemble of machine learning computer models, or the like. For example, a separate machine learning computer model may be provided for performing either a binary (e.g., 1 or 0) or non-binary (e.g., anywhere from 0.0 to 1.0) classifying of a workload as to whether it is CPU intensive or not, memory intensive or not, I/O intensive or not, network intensive or not, etc. Each of these separate machine learning computer models generates a classification output that is combined with the other classification outputs to generate a set of affinity factors.

Once the CAF computer model generates the affinity factors, a workload dispatcher applies one or more node affinity rules to schedule the workload to a node in the cloud computing system. The cloud affinity factors may be dynamically adjusted during runtime based on the performance index in order to improve the training of the CAF computer model, i.e., continuous training of the CAF computer model is made possible by using runtime execution results as additional training data to improve the training of the CAF computer model. That is, the runtime execution results with regard to the various performance characteristics may be used to update the training dataset with the static characteristics mapped to the corresponding runtime execution results with regard to the various performance characteristics. This updated training data may then be used to update the training of the CAF computer model using the newly acquired data.

Thus, an automated improved computing tool is provided for intelligently evaluating, through artificial intelligence and machine learning, both static and dynamic characteristics with regard to cloud computing system node affinity and anti-affinity. The automated improved computing tool schedules workloads on nodes of the cloud computing system based on such affinity/anti-affinity evaluations such that cloud computing system resources are better used, costs for cloud computing systems are reduced for users, and latency variability caused by resource jitter is avoided, while isolation of workloads in the cloud computing system is still achieved.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

FIG. 1 is an example diagram of the primary operational components of a cloud affinity based workload scheduler in accordance with one illustrative embodiment. The elements shown in FIG. 1 are intended to be implemented as specialized software instructions executed on computing hardware devices, specialized computing hardware devices that are configured specifically for the functionalities attributed to them herein, or any combination of specialized software instructions and specialized computing hardware devices. The computing hardware devices may include memories into which the specialized software instructions are loaded, and processors which execute the specialized software instructions loaded into the memories, for example. Regardless of the particular combination used to implement the illustrative embodiments, it should be appreciated that all illustrative embodiments described herein are specifically directed to an improved computing tool and corresponding improved computing tool operations/functionality which improve the way in which workloads are scheduled to nodes of a cloud computing system based on static and dynamic characteristics of workloads and artificial intelligence computer models.

The cloud affinity based workload scheduler 100 may be implemented, for example as part of a cloud computing system scheduler and may improve existing cloud computing schedulers, such as the K8s scheduler mechanisms, to achieve improved workload scheduling as discussed herein. As shown in FIG. 1, the cloud affinity based workload scheduler 100 includes a data collection engine 110, a feature engineering engine 120, a cloud affinity factor (CAF) computer model 130, a dispatch knowledge base storage 140, a dynamic factor adjustment engine 150, and a workload dispatcher 160. The data collection engine 110 includes a binder 112, disassembler 114, and a performance index generator 116. The feature engineering engine 120 includes an n-gram generator 122, a vector encoder 124, and a training and test data set generator 126. The CAF computer model 130 comprises one or more machine learning computer models 132-136, a cloud affinity factor generator 138, and a weight learning engine 139. The dispatch knowledge base storage 140 stores a dynamically updated dispatch knowledge base 142 specifying the dispatch classification, and constituent classifications, to which node affinity rules may be applied for determining nodes to which to dispatch a workload. The dynamic factor adjustment engine 150 comprises logic to modify dispatch classifications during runtime operation dynamically based on performance index data. The workload dispatcher 160 includes node affinity and dispatch rules 162 that may be applied to the data structures of the dispatch knowledge base 142 to determine which nodes (one or more nodes) to assign to a workload and thereby schedule the workload on those nodes. The operation of these components will be described in greater detail hereafter.

As shown in FIG. 1, during a machine learning training operation of the illustrative embodiments, workload binaries 102 and corresponding workload historical performance data 104 are input to the data collection engine 110. The workload binaries 102 are the binary code of the applications that are to be executed in the cloud computing system. The workload historical performance data 104 is data collected by performance data collection agents in the cloud computing system (not shown) which indicates resource usage over time, e.g., CPU usage, memory usage, network traffic, etc. This workload historical performance data may be collected over a predetermined period of time and stored in data structures which may then be provided as input to the data collection engine 110 as a ground truth or actual performance data for machine learning training and testing purposes, as discussed hereafter.

The workload binaries 102 are processed by the binder 112 to generate a unit symbol table data structure 113 that comprises the various symbols present in the workload binary 102. The binder 112 implements a binary to text (or symbol) translator that converts the machine code patterns of 0's and 1's in the workload binary 102 to corresponding symbols in a symbolic programming language, which are then stored in the unit symbol table data structure 113. Any suitable binary to text (or symbol) translator that is currently known or later developed, may be used by the binder 112 to generate a symbol table data structure 113 which lists the symbols corresponding to the binary patterns on a unit basis.

The symbol table data structure 113 is processed by the disassembler 114 to generate an opcode sequence 115 for the workload binary 102. The disassembler 114 takes the symbolic code of the symbol table data structure 113 and generates an opcode sequence 115 from the symbol table data structure 113, where an opcode is a single instruction that can be executed by a CPU, e.g., in the instruction "MOV AL, 34h", the opcode is "MOV" while the other components, i.e., register AL and value 34 hex, are referred to as operands which are manipulated by the opcode. The opcode sequence 115 is the sequence of opcodes corresponding to the workload binary 102. The opcode sequence 115 for an input workload binary 102 is output by the data collection engine 110 to the feature engineering engine 120.

In addition to the generation of the opcode sequence 115, the data collection engine 110 further operates on workload historical performance data 104 to extract performance indices for generation of an entry in a performance index 117 specifying historical performance characteristics of a corresponding workload binary 102 as a vector representation. For example, the performance index generator 116 analyzes the collected historical performance data 104 to extract statistical representations of the performance over time, e.g., statistics of CPU time, I/O response time, network response time, etc., where these statistics may be averages, means, absolute values, or any other suitable statistical representation of a distribution of measurements of performance over time. The extracted statistical performance data is used by the performance index generator 116 to generate performance indices that are encoded into a vector entry in the performance index data structure 117 that is associated with an identifier of the workload, with which the workload binary 102 is also associated. The performance index data structure 117, or at least the entry corresponding to the workload binary 102, is provided as input to the feature engineering engine 120 along with the opcode sequence 115 for the corresponding workload binary 102.

The n-gram generator 122 of the feature engineering engine 120 receives the opcode sequence 115 for a workload binary 102, and generates an n-gram representation of the opcode sequence 115, where the n-gram is a sequence of N terms from the opcode sequence, and where N may be predetermined to be any suitable value. For each opcode pair, e.g., (DC, DC), a frequency of the opcode pair in the whole data set may be provided, e.g., 11174916 (see FIG. 2, element 220). The whole training dataset contains all of the opcode sequences 115 of training data which are extracted from the applications.

The n-grams 123 of the opcode sequence 115 are input to the vector encoder 124 which generates a vector representation 125 of the n-grams 123. The vector representation 125 comprises a sequence of numerical values representing the n-grams according to a predetermined vocabulary (not shown). For example, the vector encoder 124 may use a text to vector, e.g., word2vec, or the like, to convert the textual representation present in n-grams to a corresponding sequence of vector values which are input to a training and test data set generator 126. Each vector representation generated by the vector encoder 124 represents a corresponding program or application present in the workload of the workload binary 102. Thus, a plurality of vector representations may be generated for the same workload, which may be comprised of a plurality of applications or programs to be executed in a cloud computing system.

In some illustrative embodiments, to generate the vector representation, as noted above, the n-grams of the opcode sequence for the training dataset are first calculated and this n-gram will include a frequency for each n-gram, e.g., each opcode pair. The n-grams may then be ranked based on their frequency and the top K most frequent n-grams may be selected as the feature dimensions of the vector representation, where K may be set to any desirable value based on the desired implementation, e.g., 1000 in some implementations. As an example, the following shows the top 9 dimensions in the example shown in FIG. 2:
[(('DC', 'DC'), 11174916), (('LA', 'ST'), 7250006), (('ST', 'ST'), 6303838), (('ST', 'BALR'), 6040259), (('L', 'LA'), 5538090), (('ST', 'LA'), 4373758), (('L', 'L'), 4156310), (('LA', 'LA'), 3643743), (('BALR', 'L'), 3318534), . . . .
Determining the 2-gram for each application, one obtains [(('DC', 'DC'), 106), (('LA', 'ST'), 145), (('ST', 'ST'), 8), (('ST', 'BALR'), 0), (('L', 'LA'), 62), (('ST', 'LA'), 102), (('L', 'L'), 49), (('LA', 'LA'), 8), (('BALR', 'L'), 10), . . . .
The vector of this application will thus be [106, 145, 8, 0, 62, 102, 49, 8, 10, . . . .] Each application may be processed in this manner to convert the application opcode sequence to a vector representation.

The training and test data set generator 126 operates on the vector representation(s) for the workload generated by the vector encoder 124 and correlates these vector representation(s) with the vector representation of the performance index 117 from the performance index generator 116. The performance index vector representation, which encodes the dynamic characteristics of the workload, is used to provided labels for the static characteristics of the workload encoded into the vector representation(s) generated by the vector encoder 124. For example, the vector representation of the performance characteristics as provided by the performance index data structure 117 may be appended to the vector representation generated by the vector encoder 124, such that a combined labeled vector representation for each of the programs or applications of a workload may be generated which comprise vector values representing static characteristics determined from the workload binaries 102, and label values representing the dynamic performance characteristics based on the historical performance data 104 for the workload. The resulting labeled vector representation may then be output to the CAF computer model 130 for training and testing.

It should be appreciated that the above process for generating a vector representation of the static characteristics and a vector representation of the dynamic performance characteristics of a workload may be performed for multiple workloads. In this way, the training data and test data set generator 126 may compile the labeled vector representations for a plurality of programs/applications of a plurality of workloads. The compiled set of labeled vector representations may be split into a set of training data and a set of testing data. The training data is used as input to the CAF computer model 130 to train the CAF computer model 130 by having the CAF computer model 130 process the static characteristic vector values to generate one or more classifications and corresponding cloud affinity factors 137. These cloud affinity factors 137 may be compared to cloud affinity factors generated based on the label vector values of the corresponding labeled vector representation to determine an error or loss in the cloud affinity factors 137 generated based on the machine learning computer model(s) 132-138 of the CAF computer model 130, and based on this error or loss, a modification of operational parameters of the CAF computer model 130, and the machine learning computer model(s) 132-138 of the CAF computer model 130, is determined using any suitable machine learning algorithms, such as linear regression, gradient descent, or the like. This process is repeated until the error or loss reaches a satisfactory level, e.g., a threshold amount of error/loss, or a predetermined number of epochs or iterations of machine learning is performed.

In this machine learning process, assuming that the CAF computer model 130 is composed of one or more neural networks 132-138, the operational parameters that are learned through this process may be weights of nodes within the neural networks, i.e., the weights of nodes are adjusted so as to minimize the error in the output of the neural network. In addition, the CAF computer model 130 may also learn weights applied to the cloud affinity factors 137 to generate a dispatch cloud affinity value via a dispatch cloud affinity formula. The weight learning model 139 may operate to learn these weights and apply them to the outputs of the one or more neural networks 132-138 to generate cloud affinity factors 137 and these cloud affinity factors 137 may be compared to a ground truth to determine an error/loss and adjust the operation of the weight learning model 139, e.g., adjust the weights applied to the outputs of the neural networks 132-138 until the error/loss is at a desired level, e.g., a threshold level of error/loss, or a predetermined number of iterations/epochs of machine learning are performed.

Once trained, the CAF computer model 130 is tested using the test data set portion of the labeled vector representations to confirm that the training was accomplished satisfactorily. Various measures of precision, accuracy, and the like, may be made and compared to threshold values of these measures to determine whether the trained CAF computer model 130 is operating satisfactorily.

In some illustrative embodiments, the CAF computer model 130 comprises a first machine learning computer model 132 for classifying the workload, as represented by the labeled vector representations, with regard to CPU usage, e.g., a classification of CPU usage intensiveness of the workload. A second machine learning computer model 134 may also be provided to classify the workload with regard to memory usage, e.g., a classification of memory usage intensiveness of the workload. A third machine learning computer model 136 may also be provided to classify the workload with regard to input/output (I/O) intensiveness. A fourth machine learning computer model 138 may be provided to classify the workload with regard to network intensiveness. Additional machine learning computer models may also be provided in combination with the models 132-138 or in replacement of one or more of these models 132-138 without departing from the spirit and scope of the present invention.

The cloud affinity factors 137 that are generated based on the outputs of the various models 132-138 may be output to a dispatch knowledge base storage 140 for storage in an entry corresponding to the workload identifier to thereby specify the cloud affinity factors 137 determined by the CAF computer model 130 for the workload. These cloud affinity factors 137 may comprise a dispatch cloud affinity factor as well as constituent cloud affinity factors, e.g., CPU intensiveness, memory intensiveness, I/O intensiveness, and network intensiveness, generated based on the outputs of the one or more computer models 132-138. Thus, the dispatch knowledge base 142 may comprise entries for workloads where each entry specifies the cloud affinity factors generated by the CAF computer model 130 for that workload.

During runtime operation, i.e., after the CAF computer model 130 has been trained on the training data and testing by the testing data, when a new workload is presented as input to the cloud affinity based workload scheduler 100, the workload is process through the above process, potentially without historical performance data for providing labels to the vector representation, and the resulting cloud affinity factors generated by the CAF computer model 130 and stored in the dispatch knowledge base 142 may be processed by the dynamic factor adjustment engine 150 and a workload dispatcher 160. The dynamic factor adjustment engine 150 may operate to dynamically modify the cloud affinity factors for performing dispatch decisions based on runtime performance analysis of the workload, as indicated by the performance index 117. That is, based on the historical data analysis, the affinity factor for an application may be obtained and then the application dispatched to a node. When the application is dispatched to the node, the resource consumption is captured and analyzed. If the trend is compliant to historical data characteristics, the data will be feed back to the dynamic factor adjustment engine 150 to generate new affinity factors and then the application can be re-scheduled to other kinds of nodes.

The workload dispatcher 160 operates on the stored cloud affinity factors of the workload in the dispatch knowledge base 142 during runtime, to dispatch the workload to one or more nodes of the cloud computing system based on the application of one or more cloud affinity and dispatch rules 162. These cloud affinity and dispatch rules 162 may comprise rules that may attempt to put all applications of a same type/orientation into the same nodes, or distribute the application into multiple nodes according to application type/orientation. These rules may determine characteristics of nodes that should be used to execute the workload, such as certain amounts of CPU availability, memory availability, I/O capability, network traffic, and the like. The requirements for nodes may then be used to search for nodes providing the requirements and then schedule the workload on these nodes of the cloud computing system. For example, "required" and "limit" are two thresholds that may be used where "required" means the minimum resources for a given application to be executed, and "limit" means the maximum resource usage that the application cannot exceed.

Figure 2:
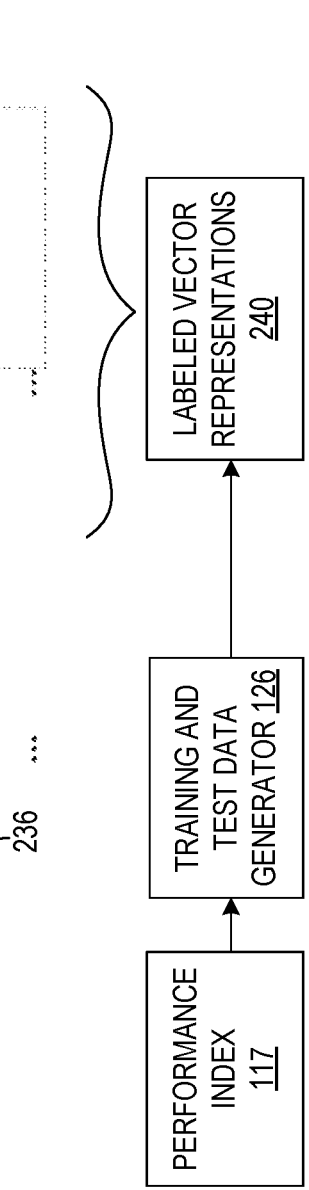
FIG. 2 is an example diagram illustrating a conversion of a workload to a labeled vector representation in accordance with one illustrative embodiment.

As discussed above, the data collection engine 110 and feature engineering engine 120 operate to convert workload characteristics to a labeled vector representation encoding both static and dynamic characteristics of the workload. FIG. 2 is an example diagram illustrating a conversion of a workload to a labeled vector representation in accordance with one illustrative embodiment. As shown in FIG. 2, the conversion involves taking the opcode sequence 210, such as generated by the data collection engine 110, and generating n-grams of the opcode 220. The opcode sequence 210 may comprise separate opcode sequences 212-216 for each "unit" of processing, where each application may have one or more compile units, e.g., if an application has 10 source code files, then its binary executable contains 10 compile units. The opcode sequence 210 is generated from the binary of the workload, e.g., 102 in FIG. 1, using a binary to text translation, for example. The n-grams comprise a sequence of n-gram specifications comprising a sequence of characters representing opcodes, e.g., "ICM BRC LA J BALR L LR ST LA L L ST L L ST TM BRC LHI CLR BRC CHI BRC LTR BRC CLFI BRC CHI BRC CHI BRC LR J LTR BRC LHI J LHI CLR." For example, "LA" is to load address into register opcode, LR is a load register into another register, etc. In some illustrative embodiments, the n-gram of the opcode sequence is converted to a vector by determining the frequency of every opcode pair, e.g., (('DC', 'DC'), 11174916) means the opcode pair ('DC', 'DC') with frequency 11174916 in the whole training dataset. After the opcode pair frequency determination, a top K frequent opcode pairs are selected, e.g., a top 1000, and used as the vector dimensions, e.g., a 1000 dimension vector.

Next, for every workload binary, the frequency of the top 1000 frequent opcode pairs is extracted. For example, (('DC', 'DC'), 11174916) is the top 1 opcode pair in the example training dataset, and for application) it's (('DC', 'DC'), 106) is extract, so the 1st dimension of application 1's vector is 106, and a similar methodology is used to obtain the other dimensions of the vector.

Thus, the n-grams are then encoded as vectors for each application 230. For example, the n-grams may be encoded as separate vectors 232-236 for each application of the workload, where the vectors 232-236 comprise a sequence of numerical values corresponding to the n-grams 220. The generated vectors 232-236 are further labeled, by the training and test data set generator 126, based on the performance index 117 generated by the performance index engine 116 based on collected performance data for the workload. The resulting labeled vector representations 240 may comprise a separate set of one or more vector representations 242-246 labeled according to the performance index information. For example, there may be a separate labeled vector representation that is labeled based on CPU usage performance index information, and a labeled vector representation that is labeled based on memory usage performance index information, in the set 242 for application vector representation 232. In some illustrative embodiments, a single labeled vector representation may be generated that comprises multiple labels for each of the performance index information.

Figure 3:
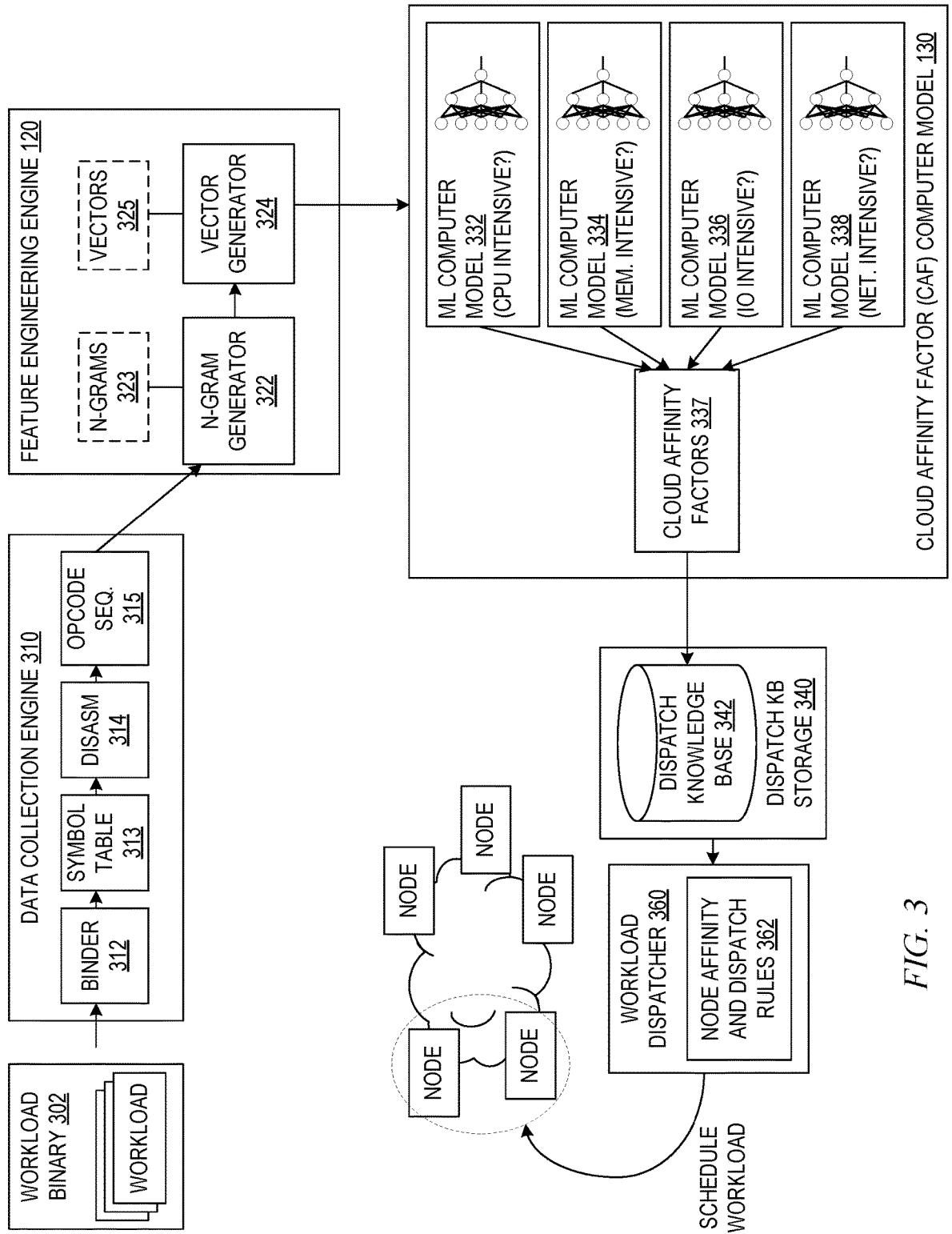
FIG. 3 is an example diagram illustrating an operation of the cloud affinity based workload scheduler during a runtime operation after machine learning training in accordance with one illustrative embodiment.

FIG. 3 is an example diagram illustrating an operation of the cloud affinity based workload scheduler during a runtime operation after machine learning training in accordance with one illustrative embodiment. As shown in FIG. 3, during runtime operation, a new workload is to be scheduled on nodes of a cloud computing system, and the workload binary 302 is provide as input to the trained cloud affinity based scheduler 300. In the data collection engine 310, the binder 312 generates the symbol table data structure 313 which is then processed by the disassembler 314 to generate the opcode sequence 315 for the new workload binary 302. The opcode sequence 315 is input to the feature engineering engine 320. The n-gram generation engine 322 generates n-grams based on the opcode sequence which are then input to the vector encoder 324 to generate a vector representation 327 of the n-grams for the workload binary 302. The vector representation 327 is input to each of the one or more trained computer models 332-338 of the trained CAF computer model 330 which operate on the vector representation 327 to classify the workload, with regard to its static features, into predicted performance classifications based on the training described previously with regard to FIG. 1. The performance classifications output by the models 322-328 are used by the cloud affinity factor engine 337 to generate cloud affinity factors that are used to populate an entry in the dispatch knowledge base 342 in the dispatch knowledge base storage 340. The entry in the dispatch knowledge base 342 is processed by the dispatch engine 360 by applying one or more node affinity and dispatch rules 362 to select one or more nodes of the cloud computing system to which to dispatch the workload. The workload is then dispatched or scheduled on these nodes of the cloud computing system.

For example, in one illustrative embodiment, the node affinity and dispatch rules 362 may comprise a rule for evaluating a dispatch affinity factor based on a calculation of individual affinity factors for each of the performance classifications generated by the CAF computer model. For example, there may be a separate affinity factor generated for CPU performance, memory performance, IO performance, network performance, and other performance classifications. Each affinity factor, in one illustrative embodiment may be calculated according to the formula:

$$F_i = (F - F_{min})/(F_{max} - F_{min}) \quad (1)$$

where Fi is the affinity factor for a performance classification type I, and $F_{max}$ and $F_{min}$ are the maximum and minimum affinity factors, respectively, across all workload candidates, thereby providing a normalized affinity factor.

The dispatch affinity factor may be a weighted combination of the individual affinity factors, such as in the following formula, for example:

$$F_{total} = \alpha F_{cpu} + \beta F_{memory} + \gamma F_{io} + \delta F_{network} + \varepsilon F_{others} \quad (2)$$

where the weight values $\alpha+\beta+\gamma+\delta+\varepsilon=1$. The weight value for each affinity factor is adjusted according to analysis of real world performance of workloads, such that the performance index for runtime workloads may be used to adjust these weights.

Thus, the illustrative embodiments provide mechanisms to train one or more machine learning computer models based on vector representations of static and dynamic characteristics of a workload so as to predict one or more performance classifications and generate affinity factors based on these predicted performance classification(s). The affinity factors are then used with node affinity and dispatch rules to select a set of one or more nodes of a cloud computing system to which to dispatch the workload, i.e., schedule the workload. Thus, the scheduling is based on an artificial intelligence based evaluation of static and dynamic characteristics of workloads. The scheduling increases affinity of nodes and workloads and decreases anti-affinity through the machine learning training. The scheduling achieves an improved load balancing across the nodes of the cloud computing system which reduces resource costs, wasted resources, and latency.

Figure 4:
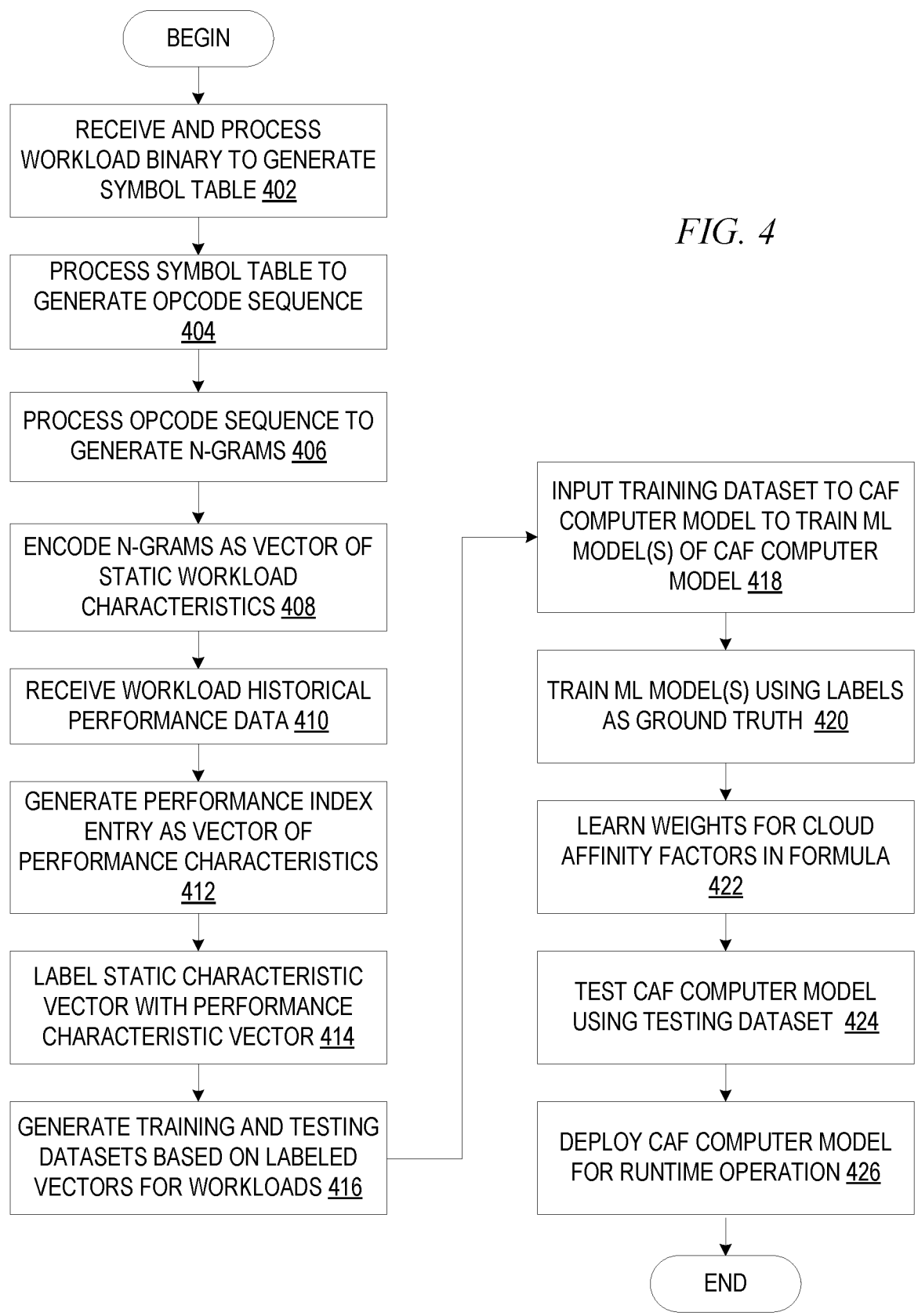
FIG. 4 is a flowchart outlining an example operation of a cloud affinity based workload scheduler during a machine learning training operation in accordance with one illustrative embodiment.
Figure 5:
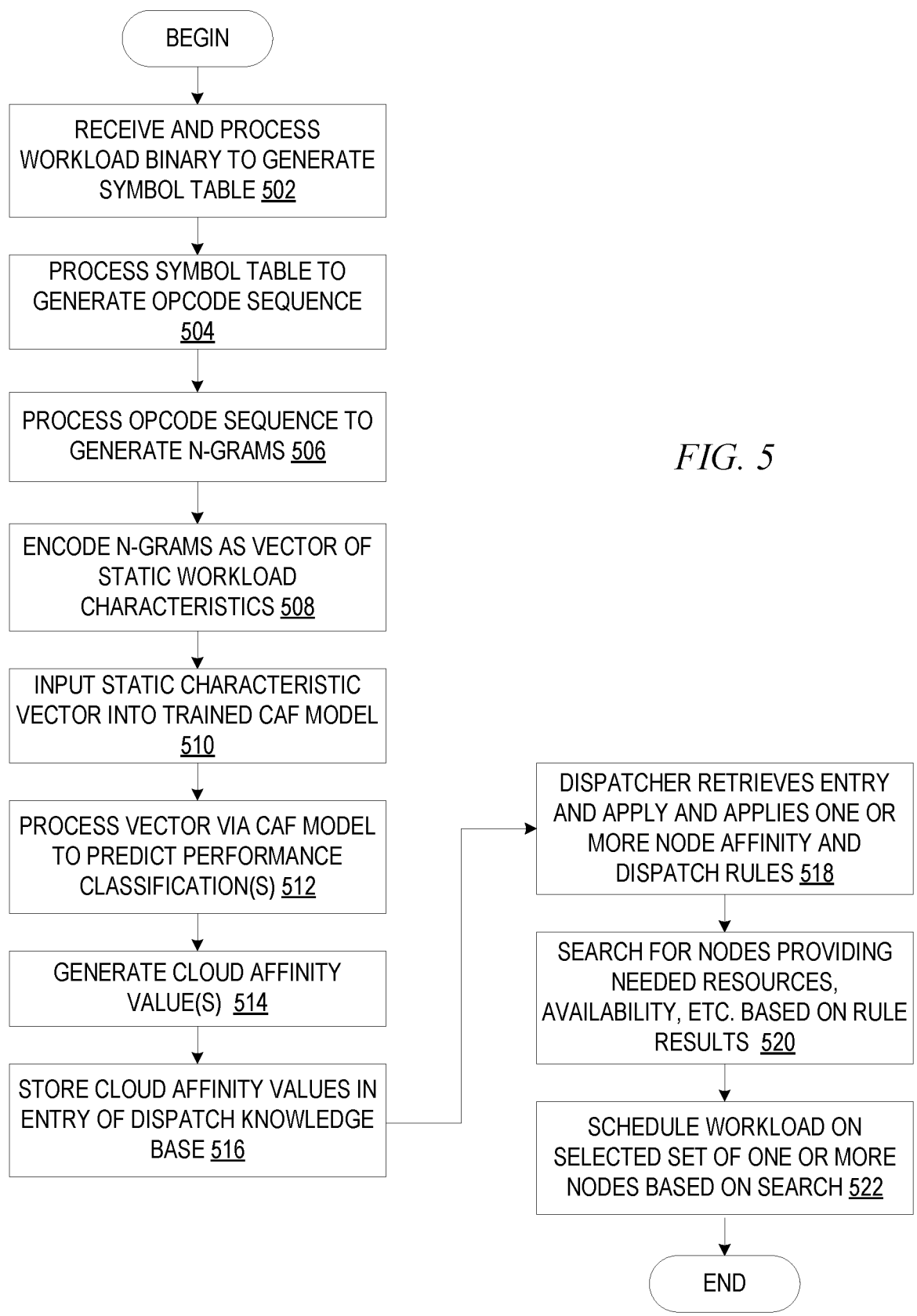
FIG. 5 is flowchart outlining an example operation of a cloud based workload scheduler during runtime operation in accordance with one illustrative embodiment.
Figure 6:
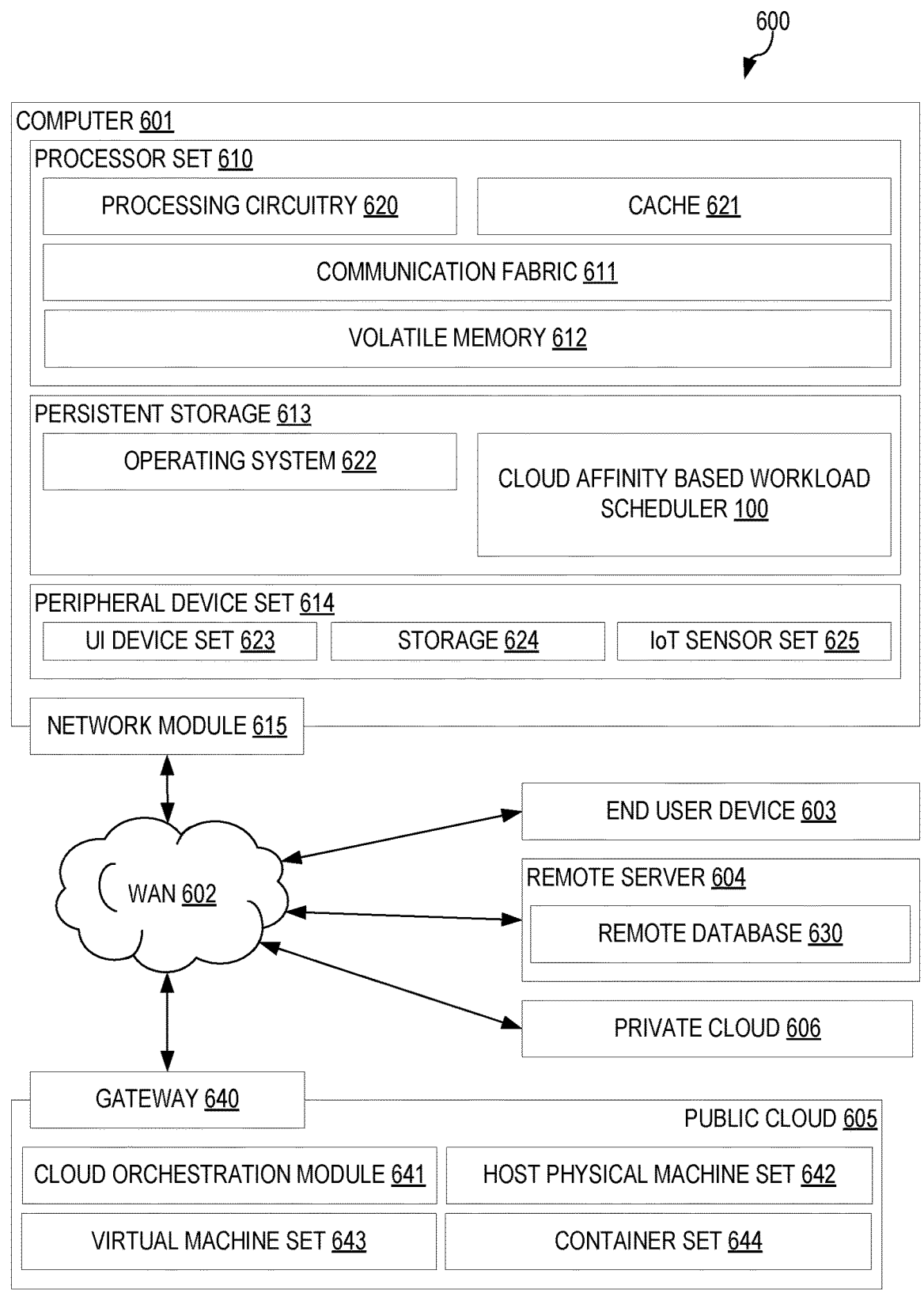
FIG. 6 is an example diagram of a distributed data processing system environment in which aspects of the illustrative embodiments may be implemented and at least some of the computer code involved in performing the inventive methods may be executed.

FIGS. 4-6 present flowcharts outlining example operations of elements of the present invention with regard to one or more illustrative embodiments. It should be appreciated that the operations outlined in FIGS. 4-6 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIGS. 4-6, and may, in some cases, make use of the results generated as a consequence of the operations set forth in FIGS. 4-6, the operations in FIGS. 4-6 themselves are specifically performed by the improved computing tool in an automated manner.

FIG. 4 is a flowchart outlining an example operation of a cloud affinity based workload scheduler during a machine learning training operation in accordance with one illustrative embodiment. The operation outlined in FIG. 4 will be described with regard to a single workload and corresponding workload binary, but it should be appreciated that in practice, this operation would be performed for a plurality of workloads and workload binaries that together will be used to generate a training data set and testing data set to train/test the cloud affinity factor (CAF) computer model. The operation outlined in FIG. 4 corresponds to the operation of the architecture shown in FIG. 1 during a training operation.

As shown in FIG. 4, the operation starts by receiving the workload binary for a workload which is processed to generate a symbol table for the workload binary, such as by using a binary to text translation (step 402). The symbol table is processed via the disassembler to generate an opcode sequence for units of the symbol table (step 404). The opcode sequence is processed by an n-gram generator that generates n-grams for the unit of opcodes (step 406). The n-grams are then encoded by a vector encoder into a static characteristic vector representation for each application/program in the workload which encodes the static characteristics of the workload (step 408).

In addition, workload historical performance data is received for the workload (step 410). The workload historical performance data is processed by a performance index generator that generates an entry in a performance index for the workload specifying performance characteristics, such as CPU usage time, I/O response time, network response time, etc., or statistical measures of such (step 412). The performance index stores this information as a vector representation with vector values corresponding to the various performance characteristics. The performance characteristics vector representation is then used as labels for labeling the static characteristic vector representation for the workload, such as by appending one or more vector values specifying labels for the workload which correspond to one or more of the encoded performance characteristics (step 414). The labeled vector representation is then used along with labeled vector representations of other workloads generated in a similar manner, to generate a training data set and testing data set (step 416).

The training dataset is input to one or more machine learning computer models of the CAF computer model as training data (step 418). The one or more machine learning computer models are trained using machine learning logic using the labels in the labeled vector representation as ground truth values for the machine learning logic (step 420). In addition, weights for cloud affinity factor formula are learned through a machine learning process based on the training data set (step 422). After training, the trained one or more machine learning computer models of the CAF computer model are then tested using the testing dataset to verify performance of the trained one or more machine learning computer models (step 424). The trained and tested CAF computer model is then deployed for runtime operation, assuming that the testing indicates that the trained CAF computer model is operating as desired (step 426). The operation then terminates.

FIG. 5 is flowchart outlining an example operation of a cloud based workload scheduler during runtime operation in accordance with one illustrative embodiment. The operation outlined in FIG. 5 is similar to that of FIG. 4 with the exception that the CAF computer model is assumed to have already been trained through a machine learning process and the runtime workload data is not labeled. To the contrary, the training of the CAF computer model is based on both the static and dynamic characteristics of workloads such that the CAF computer model, given the static characteristics of the workload, is able to predict the performance of the dynamic characteristics of the workload which are then used with cloud affinity rules to determine how to schedule the workload on nodes of a cloud computing system.

As shown in FIG. 4, the operation starts by receiving the workload binary for a workload which is processed to generate a symbol table for the workload binary, such as by using a binary to text translation (step 502). The symbol table is processed via the disassembler to generate an opcode sequence for units of the symbol table (step 504). The opcode sequence is processed by an n-gram generator that generates n-grams for the unit of opcodes (step 506). The n-grams are then encoded by a vector encoder into a static characteristic vector representation for each application/program in the workload which encodes the static characteristics of the workload (step 508).

The vector representation of the static characteristics of the workload binary are input to the trained CAF computer model (step 510). The trained CAF computer model evaluates the static characteristics and predict one or more performance classifications for the workflow based on the pattern of static characteristics represented in the static characteristic vector representation (step 512). The one or more performance classifications are used to generate one or more cloud affinity values (step 514). The resulting cloud affinity values are stored in an entry in association with a workload identifier in a dispatch knowledge base (step 516). Thereafter, a dispatcher retrieves the entry from the dispatch knowledge base when scheduling and dispatching the workload to nodes of the cloud computing system and applies one or more node affinity and dispatch rules to the affinity value(s) (step 518). A search for nodes providing the needed resources, availability, and other load balancing factors corresponding to the cloud affinity values is performed based on the results of applying the node affinity and dispatch rules, to identify a set of one or more nodes to which to dispatch the workload (step 520). The workload is then scheduled on the selected set of one or more nodes (step 522) and the operation then terminates.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a cloud affinity based workload scheduler that implements artificial intelligence to evaluate static and dynamic characteristics of workloads, via one or more machine learning trained computer models, and apply node affinity rules to affinity factors generated based on the evaluation of the static and dynamic characteristics. The improved computing tool implements mechanism and functionality, such as workload characteristic vector encoding, machine learning trained computer models, and cloud affinity rules engines, which cannot be practically performed by human beings either outside of, or with the assistance of, a technical environment, such as a mental process or the like. The improved computing tool provides a practical application of the methodology at least in that the improved computing tool is able to schedule workloads on nodes of a cloud computing system taking into account node affinity and the static and dynamic characteristics of workloads.

FIG. 6 is an example diagram of a distributed data processing system environment in which aspects of the illustrative embodiments may be implemented and at least some of the computer code involved in performing the inventive methods may be executed. That is, computing environment 600 contains an example of an environment for the execution of at least some of the computer code involved in performing the inventive methods, such as cloud affinity based workload scheduler 100 in FIG. 1. In addition to block 100, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 200, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

Computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/ or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

Processor set 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 200 in persistent storage 613.

Communication fabric 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

Persistent storage 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in block 200 typically includes at least some of the computer code involved in performing the inventive methods.

Peripheral device set 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

Network module 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

Remote server 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

Public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for scheduling workloads in a cloud computing system, the method comprising:
    training a cloud affinity factor (CAF) computer model, via a machine learning process based on a training dataset comprising static characteristics of a workload binary for a workload, and dynamic characteristics corresponding to historical performance data for the workload, such that the trained CAF computer model predicts a first performance classification for a given workload binary;
    processing, by the trained CAF computer model, a new workload to generate a second performance classification for the new workload;
    generating one or more cloud affinity factors based on the second performance classification for the new workload;
    applying at least one node affinity and dispatch rule to the one or more cloud affinity factors to select one or more nodes of the cloud computing system to which to dispatch the new workload; and
    scheduling the new workload on the selected one or more nodes.

2. The method of claim 1, wherein training the CAF computer model comprises extracting the static characteristics from the workload binary and encoding the static characteristics as a feature vector.

3. The method of claim 2, wherein training the CAF computer model comprises extracting the dynamic characteristics from the historical performance data for the workload and building a performance index for multiple performance factors of the workload, and wherein the performance index is used as ground truth labels, during the training, for the static characteristics of the workload encoded in the feature vector s to specify a predicted performance that will be achieved with the workload.

4. The method of claim 3, wherein training the CAF computer model comprises processing the feature vector to generate the first performance classification, comparing the first performance classification to the performance index to determine a loss, and modifying operational parameters of the CAF computer model to reduce the loss.

5. The method of claim 2, wherein extracting the static characteristics from the workload binary comprises:
  extracting a plurality of n-grams, each n-gram comprising a pattern of one or more opcodes;
  associating, for each n-gram, a frequency of occurrence of the pattern of one or more opcodes of that n-gram, in the training dataset; and
  selecting a subset of n-grams, from the plurality of n-grams, based on the frequency of occurrence of each n-gram.

6. The method of claim 5, wherein first dimensions corresponding to the subset of n-grams are selected as second dimensions for the feature vector.

7. The method of claim 1, wherein the CAF computer model comprises a plurality of computer models, each corresponding to a different type of performance classification, and wherein the CAF computer model is an ensemble of the plurality of computer models that generates a combined set of affinity factors based on outputs from the plurality of computer models.

8. The method of claim 7, wherein the plurality of computer models comprises a first machine learning computer model for classifying input workloads with regard to central processing unit (CPU) usage, a second machine learning computer model for classifying the input workloads with regard to memory usage, a third machine learning computer model for classifying the input workloads with regard to input/output intensiveness, and a fourth machine learning computer model for classifying the input workloads with regard to networking intensiveness.

9. The method of claim 1, further comprising learning, through the machine learning process, weights to be applied to each of the one or more cloud affinity factors to generate a dispatch cloud affinity value based on a dispatch cloud affinity formula.

10. The method of claim 1, wherein generating the one or more cloud affinity factors based on the second performance classification for the new workload comprises storing an entry for the new workload in a dispatch knowledge base, wherein the entry specifies the one or more cloud affinity factors, and wherein applying the at least one node affinity and dispatch rule to the one or more cloud affinity factors comprises a dispatcher retrieving the entry from the dispatch knowledge base and searching a set of nodes based on the at least one node affinity and dispatch rule to find at least one node in the set of nodes that provides resources to satisfy performance criteria corresponding to the one or more cloud affinity factors.

11. A computer program product comprising a non-transitory computer readable storage medium having a computer readable program stored therein, wherein the computer readable program, when executed on a data processing system, causes the data processing system to schedule workloads in a cloud computing system at least by:
  training a cloud affinity factor (CAF) computer model, via a machine learning process based on static characteristics of a workload binary for a workload, and dynamic characteristics corresponding to historical performance data for the workload, such that the trained CAF computer model predicts a first performance classification for a given workload binary;
  processing, by the trained CAF computer model, a new workload to generate a second performance classification for the new workload;
  generating one or more cloud affinity factors based on the second performance classification for the new workload;
  applying at least one node affinity and dispatch rule to the one or more cloud affinity factors to select one or more nodes of the cloud computing system to which to dispatch the new workload; and
  scheduling the new workload on the selected one or more nodes.

12. The computer program product of claim 11, wherein training the CAF computer model comprises extracting the static characteristics from the workload binary and encoding the static characteristics as a feature vector.

13. The computer program product of claim 12, wherein training the CAF computer model comprises extracting the dynamic characteristics from the historical performance data for the workload and building a performance index for multiple performance factors of the workload, and wherein the performance index is used as ground truth labels, during the training, for the static characteristics of the workload encoded in the feature vector, to specify a predicted performance that will be achieved with the workload.

14. The computer program product of claim 13, wherein training the CAF computer model comprises processing the feature vector to generate the first performance classification, comparing the first performance classification to the performance index to determine a loss, and modifying operational parameters of the CAF computer model to reduce the loss.

15. The computer program product of claim 12, wherein extracting the static characteristics from the workload binary comprises:
  extracting a plurality of n-grams, each n-gram comprising a pattern of one or more opcodes;
  associating, for each n-gram, a frequency of occurrence of a pattern of one or more opcodes of that n-gram, in a training dataset; and
  selecting a subset of n-grams, from the plurality of n-grams, based on the frequency of occurrence of each n-gram.

16. The computer program product of claim 15, wherein first dimensions corresponding to the subset of n-grams are selected as second dimensions for the feature vector.

17. The computer program product of claim 11, wherein the CAF computer model comprises a plurality of computer models, each corresponding to a different type of performance classification, and wherein the CAF computer model is an ensemble of the plurality of computer models that generates a combined set of affinity factors based on outputs from the plurality of computer models.

18. The computer program product of claim 17, wherein the plurality of computer models comprises a first machine learning computer model for classifying input workloads with regard to central processing unit (CPU) usage, a second machine learning computer model for classifying the input workloads with regard to memory usage, a third machine learning computer model for classifying the input workloads with regard to input/output intensiveness, and a fourth machine learning computer model for classifying the input workloads with regard to networking intensiveness.

19. The computer program product of claim 11, further comprising learning, through the machine learning process, weights to be applied to each of the one or more cloud affinity factors to generate a dispatch cloud affinity value based on a dispatch cloud affinity formula.

20. An apparatus comprising:
   at least one processor; and
   at least one memory coupled to the at least one processor, wherein the at least one memory comprises instructions which, when executed by the at least one processor, cause the at least one processor to schedule workloads in a cloud computing system at least by:

training a cloud affinity factor (CAF) computer model, via a machine learning process based on static characteristics of a workload binary for a workload, and dynamic characteristics corresponding to historical performance data for the workload, such that the trained CAF computer model predicts a first performance classification for a given workload binary;
   processing, by the trained CAF computer model, a new workload to generate a second performance classification for the new workload;
   generating one or more cloud affinity factors based on the second performance classification for the new workload;
   applying at least one node affinity and dispatch rule to the one or more cloud affinity factors to select one or more nodes of the cloud computing system to which to dispatch the new workload; and
   scheduling the new workload on the selected one or more nodes.

\* \* \* \* \*